May 27, 1930.  P. M. SWINNEY  1,759,966
DATE PICKING PLATFORM
Filed Jan. 23, 1928
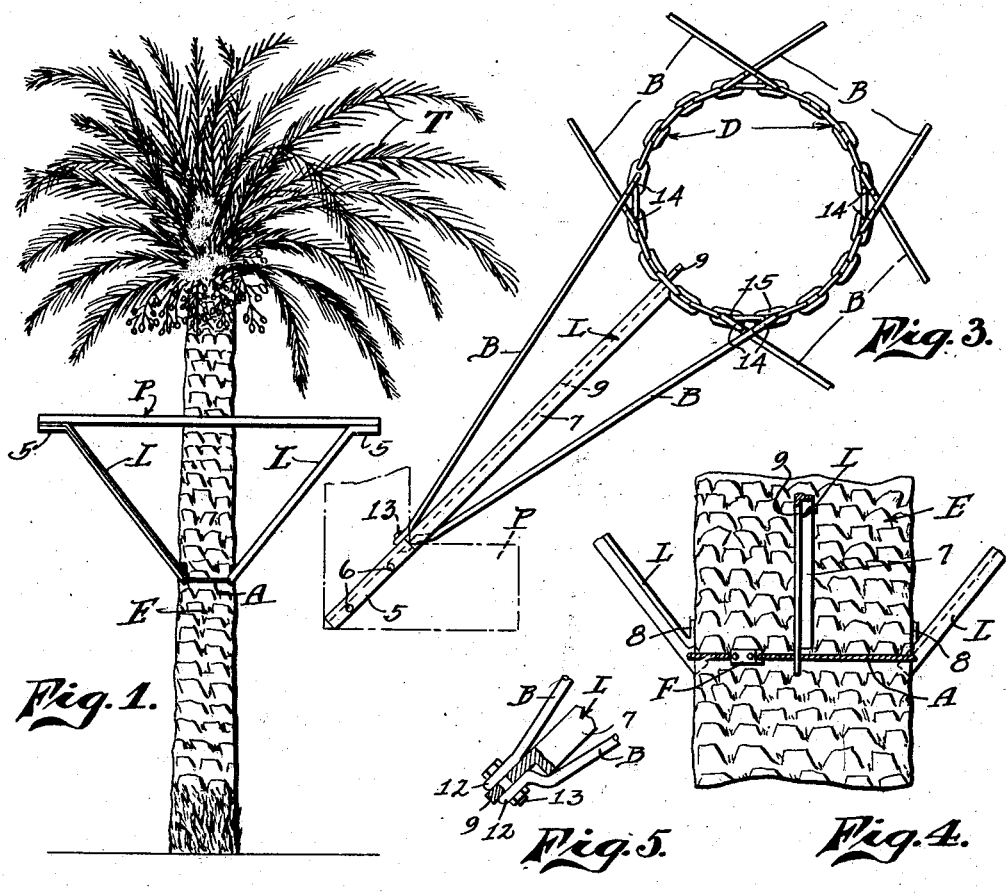
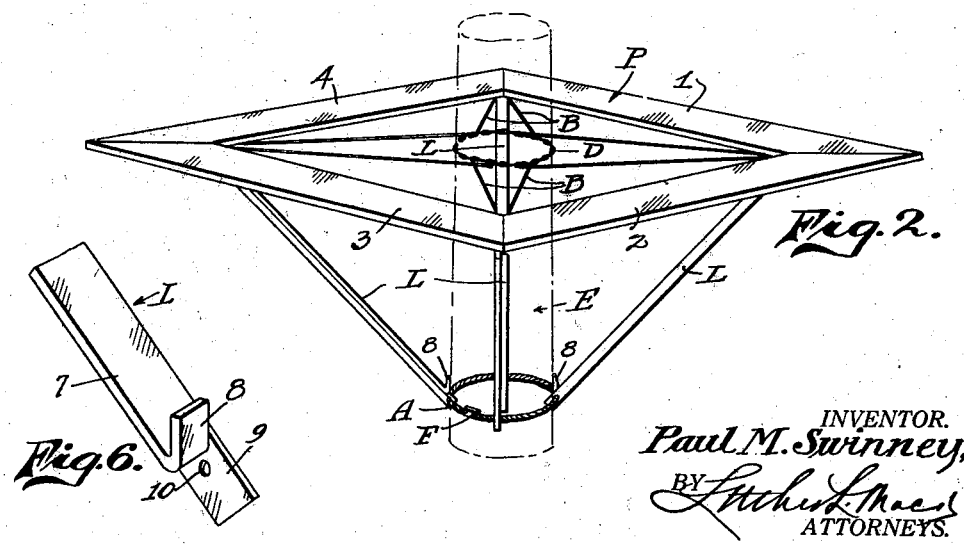
INVENTOR.
Paul M. Swinney,
BY
ATTORNEYS.

Patented May 27, 1930

1,759,966

UNITED STATES PATENT OFFICE

PAUL M. SWINNEY, OF LOS ANGELES, CALIFORNIA

DATE-PICKING PLATFORM

Application filed January 23, 1928. Serial No. 248,740.

This invention relates to and has for a main object the provision of an improved collapsible platform arranged for detachable and adjustable connection with a tree for the purpose of facilitating the picking of fruit, and particularly adapted for use by date pickers.

An object is to provide a fruit picker's platform comprising a platform surrounding a tree and having inclined braces depending therefrom and attachable to the tree at a level substantially below that of the platform, together with means for additionally bracing the platform at the level thereof.

Other objects will appear as the description progresses.

I have shown a preferred embodiment of my invention in the accompanying drawings, subject to modification within the scope of the appended claims without departing from the spirit thereof. In said drawings:

Fig. 1 is a side elevation of my improved platform suitably supported on the bole of a date palm tree so as to facilitate the picking of the fruit.

Fig. 2 is a perspective view of the same showing plural supporting and bracing devices employed for suitably supporting the platform on a tree.

Fig. 3 is a fragmentary plan view of the same.

Fig. 4 is a fragmentary enlarged elevation of the platform supporting devices shown attached to the bole of a palm tree.

Fig. 5 is a fragmentary view showing a manner and means for connecting the supporting members together at the platform level.

Fig. 6 is a perspective view of the lower portion of one of the main supporting members.

In its preferred form my invention comprises a rectangular platform P composed of mitered boards 1, 2, 3 and 4, a plurality of inclined supporting legs L, L etc., a plurality of guys or braces B, B etc., and a pair of circular tree engaging bands A and D.

The platform P is mounted on the upper horizontally bent portions of the legs L, L etc., there being four of said legs formed preferably of angle iron so as to provide rigidity and strength. The adjacent ends of the boards 1, 2, 3 and 4 forming the platform are mitered and overlie the portions 5 of the legs L and are adapted to be suitably secured thereto by means of screws or bolts 6.

The legs L are inclined downwardly and inwardly from the inner edge of the platform P at an angle of approximately 45 degrees and the webs 7 thereof are bent upwardly at 8 at acute angles to rest against the bole E of a tree T, while the flanges 9 extend below the portions 8 for engagement with the rough surface of the tree. All of the legs L are connected with the lower band A which may be a flexible cable extended through apertures 10 in the leg flanges 9 and having its ends connected together by means of a suitable cable clamp F.

Near the inner edge of the platform P the legs L are attached to a plurality of braces B, B etc. arranged in pairs and adapted to connect and brace the platform P with the upper band D, as shown. The members B are preferably metal rods and are connected at their outer ends 12 with the flanges 9 of the legs by means of bolts 13. One pair of said members B is attached to each of the legs L by one of the bolts 13 and the members of each pair are diagonally disposed and connect with the band—preferably a linked chain D—at spaced points. The members B of each pair of braces overlap the members of the other pairs and the inner ends of all members B are formed with loops 14 adapted to connect with links 15 of the chain D, as shown in Fig. 3, in a manner similar to the arrangement of the spokes of bicycle wheels.

Thus it will be observed that the platform when so supported on a tree by the means described and shown will be substantially rigid and immovable. Said platform may be adjusted as to its elevation by loosening the bands A and D and moving the same either upwardly or downwardly, as may be desired, after which the bands A and D may again be tightened.

My invention is particularly useful for date pickers and as the growth of the date palms is not rapid, the necessity for adjusting the platforms is infrequent. When used on other kinds of trees the platforms may, however, be readily adjusted to meet requirements of use, and by the removal of the platform boards the entire device may be collapsed for transportation from one place to another with facility.

In practice the boards of the platform may be overlapped at the ends instead of being mitered as shown, this not being material to my invention. Also in lieu of one of the links of the chain D I may provide a hook by means of which the chain may be readily connected and disconnected at its ends.

What I claim, is:

1. A fruit picker's platform comprising a platform, inclined legs arranged to support the platform at their upper ends and to abut the bole of the tree at their lower ends, a cable extending through said legs and around said tree and clamped together at its ends, a chain in the plane of the platform encircling said tree, and braces connecting said chain and said legs, for adjustably supporting said device on the tree.

2. A device as described comprising a platform extending around a tree in spaced relation thereto, legs connected at their upper ends to said platform, a cable extending around the tree and connected to the lower ends of said legs, a chain extending around the tree, and brace rods connected at their inner ends to said chain and at their outer ends to said legs for holding said platform in spaced relation to the tree.

3. A device as described comprising a platform extending around a tree in spaced relation thereto, legs connected at their upper ends to said platform, a cable extending around the tree and connected to the lower ends of said legs, lugs on the lower ends of said legs for engaging the bole of the tree, a chain extending around the tree, and brace rods connected at their inner ends to said chain and at their outer ends to said legs for holding said platform in spaced relation to the tree.

4. A device as described comprising a platform extending around a tree in spaced relation thereto, legs connected at their upper ends to said platform, a cable extending around the tree and connected to the lower ends of said legs, lugs on the lower portions of said legs for engaging the bole of the tree, and the lower ends of the legs engaging the rough surfaces of the tree, a chain extending around the tree, and brace rods connected at their inner ends to said chain and at their outer ends to said legs for holding said platform in spaced relation to the tree.

5. A device as described comprising a platform extending around a tree in spaced relation thereto, legs connected at their upper ends to said platform, a cable extending around the tree and connected to the lower ends of said legs, a chain extending around the tree, and brace rods connected at their inner ends to said chain and at their outer ends to said legs for holding said platform in spaced relation to the tree, said brace rods being arranged in pairs with each pair connected to one of said legs.

6. A device as described comprising a platform extending around a tree in spaced relation thereto, legs connected at their upper ends to said platform, a cable extending around the tree and connected to the lower ends of said legs, a chain extending around the tree, and brace rods connected at their inner ends to said chain and at their outer ends to said legs for holding said platform in spaced relation to the tree, said brace rods being arranged in pairs with each pair connected to one of said legs, and the rods of each pair respectively crossing rods of other pairs.

PAUL M. SWINNEY.